(12) United States Patent
Chen

(10) Patent No.: US 10,958,875 B2
(45) Date of Patent: Mar. 23, 2021

(54) METHOD AND SYSTEM ENCRYPTING AND DECRYPTING AUDIO/VIDEO FILE

(71) Applicant: Xiamen Sigmastar Technology Ltd., Xiamen (CN)

(72) Inventor: Lijing Chen, Shenzhen (CN)

(73) Assignee: XIAMEN SIGMASTAR TECHNOLOGY LTD., Xiamen (CN)

( * ) Notice: Subject to any disclaimer, the term of this patent is extended or adjusted under 35 U.S.C. 154(b) by 393 days.

(21) Appl. No.: 16/188,707

(22) Filed: Nov. 13, 2018

(65) Prior Publication Data

US 2019/0238795 A1   Aug. 1, 2019

(30) Foreign Application Priority Data

Feb. 1, 2018   (CN) .......................... 201810104311.0

(51) Int. Cl.
*H04N 5/913* (2006.01)
*H04N 7/167* (2011.01)
*H04N 21/6334* (2011.01)

(52) U.S. Cl.
CPC .......... *H04N 7/1675* (2013.01); *H04N 5/913* (2013.01); *H04N 21/63345* (2013.01); *H04N 2005/91364* (2013.01)

(58) Field of Classification Search
CPC .......... H04N 7/1675; H04N 21/63345; H04N 5/913; H04N 2005/91364; H04N 5/781; H04N 2005/91307
See application file for complete search history.

(56) References Cited

U.S. PATENT DOCUMENTS

| 2004/0131188 A1* | 7/2004 | Wang | H04L 9/0891 380/270 |
| 2009/0122149 A1* | 5/2009 | Ishii | H04N 1/00514 348/222.1 |
| 2012/0095922 A1* | 4/2012 | Wada | G06F 21/6245 705/51 |

\* cited by examiner

*Primary Examiner* — Nelson S. Giddins
(74) *Attorney, Agent, or Firm* — WPAT, PC

(57) ABSTRACT

An encrypting and decrypting method applied to a system including at least one camera device and a hard disk video decoder includes: transmitting a handshake signal to the camera device which supports an encryption function and has selected the encryption function, wherein the handshake signal includes first identifier information uniquely corresponding to a chip of the hard disk video recorder; receiving the handshake signal; generating a key according to the first identifier information of the hard disk video recorder in the handshake signal and second identifier information uniquely corresponding to a chip of the camera device; encrypting an audio/video file recorded by the camera device according to the key to generate an encrypted audio/video file bitstream; and receiving and decrypting the encrypted audio/video file bitstream.

20 Claims, 3 Drawing Sheets

METHOD AND SYSTEM ENCRYPTING AND DECRYPTING AUDIO/VIDEO FILE

This application claims the benefit of China application Serial No. 201810104311.0, filed Feb. 1, 2018, the subject matter of which is incorporated herein by reference.

BACKGROUND OF THE INVENTION

Field of the Invention

The invention relates to the technical field of audio/video file encryption and decryption, and more particularly to a method and a system encrypting and decrypting an audio/video file recorded by a camera device.

Description of the Related Art

With the development of technologies and higher demands on the daily lives and work of people, security monitoring systems have become increasingly comprehensive. In locations of various fields, the numbers of monitoring camera devices installed are ever-expanding, providing lives and work of people with certain level of security guarantee.

However, it is discovered over extended research and development that, in a current security monitoring system, an audio/video file recorded by a camera device can be easily leaked. Once a recorded audio/video file is leaked, a series of privacy protection issues can be triggered.

SUMMARY OF THE INVENTION

It is a primary technical issue of the present invention to provide a method and a system encrypting and decrypting an audio/video file so as to enhance privacy and security of an audio/video file recorded by a camera device.

To solve the above technical issue, a method encrypting an audio/video file is provided according to a technical solution of the present invention. The method, applied to a system including at least one camera device and a hard disk video recorder, includes: receiving a handshake signal, which includes first identifier information uniquely corresponding to a first chip of the hard disk video recorder; generating a key according to the first identifier information of the hard disk video recorder in the received handshake signal and second identifier information uniquely corresponding to a second chip of the hard disk video recorder; and encrypting an audio/video file recorded by the hard disk video recorder according to the key to generate an encrypted audio/video file bitstream, such that the encrypted audio/video file bitstream can be decrypted and watched uniquely only in the hard disk video recorder having the first identifier information.

To solve the above technical issue, a method decrypting an audio/video file is provided according to another technical solution of the present invention. The method, applied to a system including at least one camera device and a hard disk video recorder, includes: sending a handshake signal, wherein the camera device supports an encryption function and has selected the encryption function, and the handshake signal includes first identifier information uniquely corresponding to a first chip of the hard disk video recorder; and receiving and decrypting an encrypted audio/video file bitstream, wherein the encrypted audio/video file bitstream is obtained from performing encryption according to a key generated by the camera device, the key is generated according to the first identifier information of the hard disk video recorder in the handshake signal and second identifier information uniquely corresponding to a second chip of the camera device, and the encrypted audio/video file bitstream can be decrypted and watched uniquely only in the hard disk video recorder having the first identifier information.

To solve the above technical issue, a method encrypting and decrypting an audio/video file is provided according to another technical solution of the present invention. The method, applied to a system including at least one camera device and a hard disk video recorder, includes: sending a handshake signal, wherein the camera device supports an encryption function and has selected the encryption function, and the handshake signal includes first identifier information uniquely corresponding to a first chip of the hard disk video recorder; receiving the handshake signal; generating a key according to the first identifier information of the hard disk video recorder in the received handshake signal and second identifier information uniquely corresponding to a second chip of the hard disk video recorder; encrypting an audio/video file recorded by the hard disk video recorder according to the key to generate an encrypted audio/video file bitstream, such that the encrypted audio/video file bitstream can be decrypted and watched uniquely only in the hard disk video recorder having the first identifier information; and receiving and decrypting the encrypted audio/video file bitstream.

To solve the above technical issue, a camera device encrypting an audio/video file is provided according to another technical solution of the present invention. The camera device performs steps of: receiving a handshake signal, which includes first identifier information uniquely corresponding to a first chip of the hard disk video recorder; generating a key according to the first identifier information of the hard disk video recorder in the received handshake signal and second identifier information uniquely corresponding to a second chip of the hard disk video recorder; and encrypting an audio/video file recorded by the hard disk video recorder according to the key to generate an encrypted audio/video file bitstream, such that the encrypted audio/video file bitstream can be decrypted and watched uniquely only in the hard disk video recorder having the first identifier information.

To solve the above technical issue, a hard disk video recorder decrypting an audio/video file is provided according to another technical solution of the present invention. The hard disk video recorder performs steps of: sending a handshake signal to at least one camera device, wherein the camera device supports an encryption function and has selected the encryption function, and the handshake signal includes first identifier information uniquely corresponding to a first chip of the hard disk video recorder; and receiving and decrypting an encrypted audio/video file bitstream, wherein the encrypted audio/video file bitstream is obtained from performing encryption according to a key generated by the camera device, the key is generated according to the first identifier information of the hard disk video recorder in the handshake signal and second identifier information uniquely corresponding to a second chip of the camera device, and the encrypted audio/video file bitstream can be decrypted and watched uniquely only in the hard disk video recorder having the first identifier information.

To solve the above technical issue, a system encrypting and decrypting an audio/video file is provided according to another technical solution of the present invention. The system includes at least one camera device and a hard disk video recorder, and performs steps of: the hard disk video recorder sending a handshake signal to the camera device, wherein the camera device supports an encryption function and has selected the encryption function, and the handshake signal includes first identifier information uniquely corresponding to a first chip of the hard disk video recorder; the camera device receiving the handshake signal; the camera device generating a key according to the first identifier information of the hard disk video recorder in the received handshake signal and second identifier information uniquely corresponding to a second chip of the hard disk video recorder; the camera device encrypting an audio/video file recorded by the hard disk video recorder according to the key to generate an encrypted audio/video file bitstream, such that the encrypted audio/video file bitstream can be decrypted and watched uniquely only in the hard disk video recorder having the first identifier information; and the hard disk video recorder receiving and decrypting the encrypted audio/video file bitstream.

The present invention provides the following effects. Different from the prior art, in the present invention, a key is generated according to the second identifier information of the camera device and the first identifier information of the hard disk video recorder to encrypt an audio/video file recorded by the camera device, such that the encrypted audio/video file bitstream can be decrypted and watched uniquely only in the hard disk video recorder having the corresponding first identifier information. Thus, even if the audio/video file is leaked, the audio/video file cannot be played without the hard disk video recorder having the first identifier information, thereby enhancing the privacy and security of the audio/video file.

The above and other aspects of the invention will become better understood with regard to the following detailed description of the preferred but non-limiting embodiments. The following description is made with reference to the accompanying drawings.

DETAILED DESCRIPTION OF THE INVENTION

Specific details are given in the description below to fully understand the present invention. It should be noted that, the present invention can be implemented by various other methods that are not described herein, and a person skilled in the art can make similar modifications and arrangements without departing from the spirit of the present invention. Therefore, the present invention is not limited by the embodiments disclosed below.

In view of the issues of the prior art, the present invention provides a method and a system encrypting and decrypting an audio/video file. Details of the present invention are given in the embodiments with the accompanying drawings below.

Figure 1:
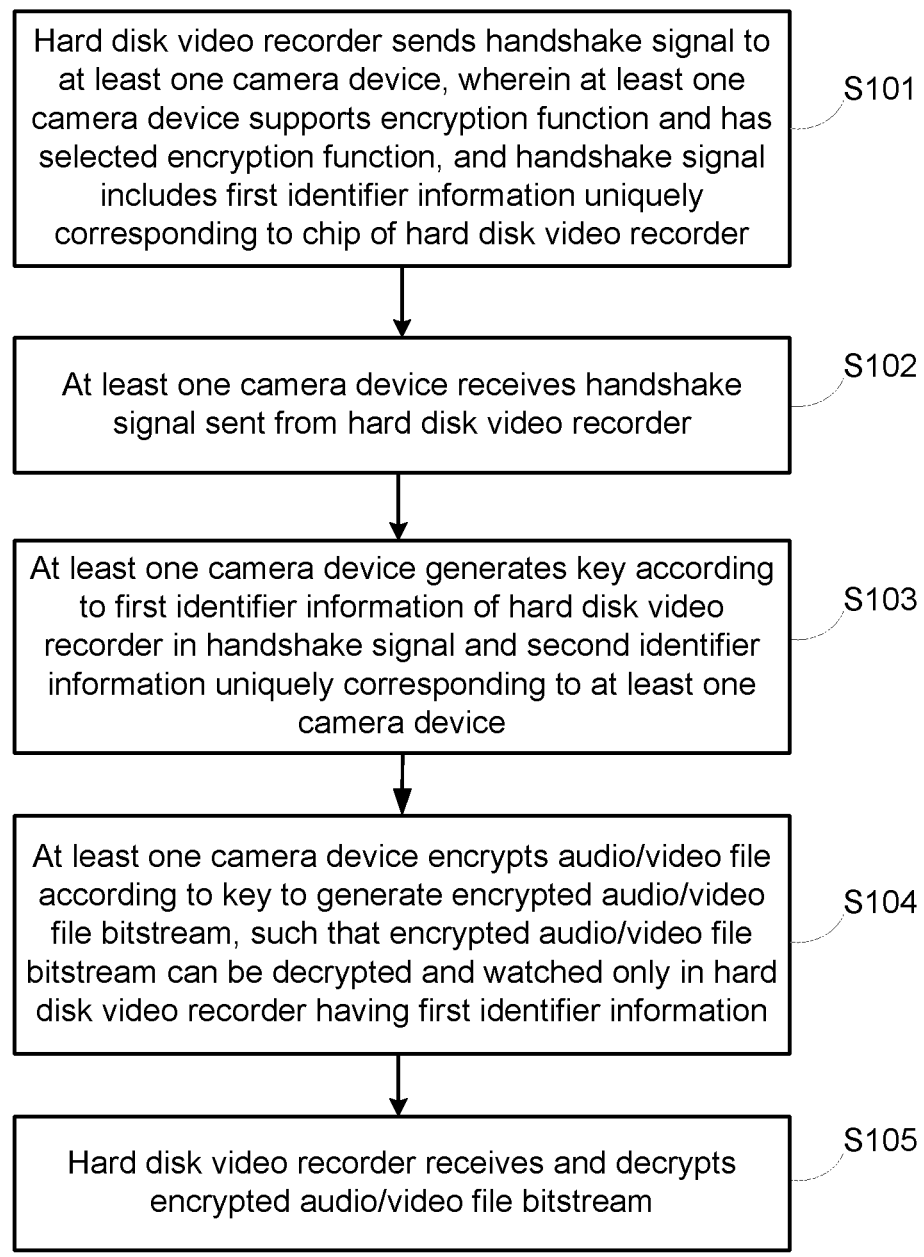
FIG. 1 is a flowchart of a method encrypting and decrypting an audio/video file according to an embodiment of the present invention.

FIG. 1 shows a flowchart of a method encrypting and decrypting an audio/video file according to an embodiment of the present invention. The method is applied to a system including at least one camera device and a hard disk video recorder, and includes the following steps.

In step S101, the hard disk video recorder sends a handshake signal to the at least one camera device, wherein the at least one camera device is confirmed to support an encryption function and has selected the encryption function, and the handshake signal includes first identifier information uniquely corresponding to a chip of the hard disk video recorder.

The camera device may be a device having a camera function, such as a camera or a video camera, and is used for capturing images, audio files and video files. The hard disk video recorder is an audio/video file recording device, and is used in collaboration with the camera device. The hard disk video recorder receives audio/video file data collected by the camera device, generates sounds and images through encoding, and plays the sounds and images. Specifically, the number of camera device in the embodiment can be at least one, and the at least one camera device and the hard disk video recorder may respectively be a camera device and a monitoring server in a security monitoring system and are used in collaboration to achieve the object of image file monitoring.

The expression "the camera device supports an encryption function and has selected the encryption function" means that, the camera device has a function of encrypting an audio/video file captured by itself or obtained through other means, and the function is currently set to an activated state and a bitstream of the audio/video file outputted by the camera device can be directly and automatically encrypted.

The first identifier information uniquely corresponding to the chip of the hard disk video recorder included in the handshake signal is specifically a unique identifier of the chip of the hard disk video recorder, and the corresponding camera device can determine the corresponding hard disk video recorder according to the first identifier information received, and further use the first identifier information for subsequent operations.

Before the audio/video file recorded by the camera device is played, or after the corresponding information sent from the camera device is received and the corresponding camera device is determined, the hard disk video recorder sends the above handshake signal to the camera device.

Figure 2:
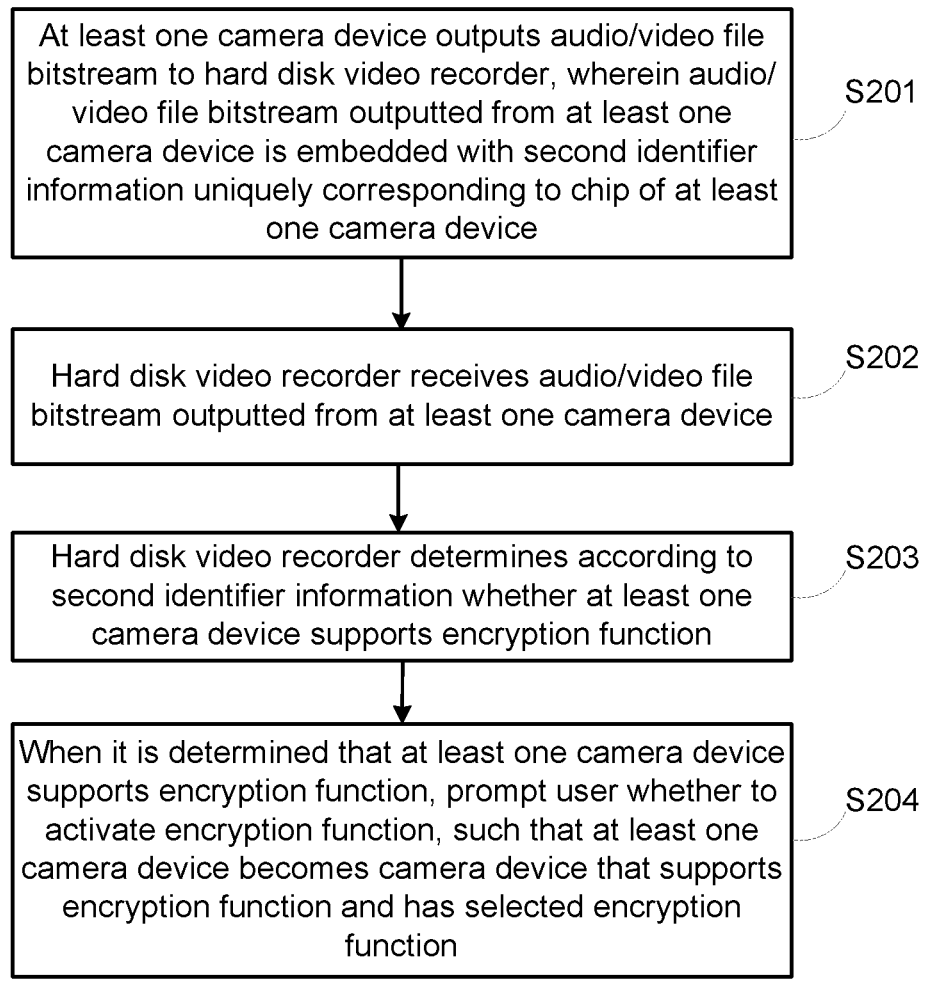
FIG. 2 is a flowchart before step S101 in FIG. 1 of the present invention.

Specifically, referring to FIG. 2, in an application scenario, before step S101, the method encrypting and decrypting an audio/video file recorded by the at least one camera device of the present invention further includes the following steps.

In step S201, the at least one camera device outputs the audio/video file bitstream to the hard disk video recorder, wherein the audio/video file bitstream outputted by the at least one camera device is embedded with second identifier information uniquely corresponding to a chip of the at least one camera device.

In step S202, the hard disk video recorder receives the audio/video file bitstream outputted from the at least one camera device, wherein the outputted audio/video file bitstream may include audio/video file data recorded by the camera device, and the second identifier information uniquely corresponding to the chip of the camera device and embedded in the audio/video file is specifically the unique identifier of the chip of the camera device.

Further, in this embodiment, the audio/video file bitstream received by the hard disk video recorder and outputted from the camera device may be an audio/video file bitstream outputted from the camera device and received by the hard disk video recorder for the first time.

In step S203, the hard disk video recorder determines, according to the second identifier information, whether the at least one camera device supports an encryption function.

Specifically, after the hard disk video recorder receives the audio/video file bitstream outputted from the corresponding camera device, the second identifier information uniquely corresponding to the chip of the corresponding camera device can be obtained therefrom. After analysis processing performed on the second identifier information, it can be known whether the camera device has a function for encrypting the audio/video file bitstream outputted therefrom.

In step 204, when it is determined that the at least one camera device supports an encryption function, a user is prompted whether to activate the encryption function, such that, after the user determines to activate the encryption function, the at least one camera device becomes a camera device that supports an encryption function and has selected the encryption function.

When the hard disk video recorder determines that the corresponding camera device supports the encryption function, a prompt can be issued to the user to prompt the user whether to activate the encryption function, and the at least one camera device becomes a camera device that supports an encryption function and has selected the encryption function after the user determines to activate the encryption function.

In an application scenario, the camera device sends the audio/video file recorded thereof to the hard disk video recorder, and the hard disk video recorder determines, according to the second identifier information corresponding to the chip of the camera device, that the camera device has become a camera device that supports the encryption functions. The hard disk video recorder then issues a prompt to the user through a display interface in a form of a pop-up window or a speech, or in other forms, such as "The front-end camera device supports advanced security encryption. Is the security encryption to be activated?" and a corresponding operation is performed according to a user selection. For example, if the user chooses to activate the security encryption, the camera device automatically activates the security encryption function, so as to encrypt the audio/video file bitstream outputted therefrom.

The audio/video file bitstream outputted from the camera device is embedded with the second identifier information uniquely corresponding to the camera device, and the hard disk video recorder determines whether the camera device supports an encryption function according to the second identifier information. When it is determined that the encryption function is supported, a prompt is issued to the user to prompt the user whether to activate the encryption function, and the camera device becomes a camera device that supports an encryption function and has selected the encryption function after the user determines to activate the encryption function.

In an embodiment, the handshake signal includes the first identifier information of the chip of the hard disk video recorder and a public key of the hard disk video recorder.

At this point, the key generated by the corresponding camera device is encrypted by double encryption by using a private key of the camera device and the public key of the hard disk video recorder, and the double-encrypted key and the public key of the camera device are together inserted into an audio/video file packet recorded by the camera device. After the hard disk video recorder receives the encrypted audio/video file bitstream, the hard disk video recorder decrypts the key according to the public key of the camera device and the private key of the hard disk video recorder so as to further decrypt the audio/video file bitstream.

In one embodiment, the at least one camera device is an Internet Protocol camera (IPC), and the hard disk video recorder is a network video recorder (NVR). At this point, the hard disk video recorder can send the handshake signal to the camera device by means of the Ethernet.

It should be noted that, in the above method, even if the audio/video file outputted from the camera device is duplicated to another playback device, or a network camera stores a recorded audio/video file in a third-party network or a cloud storage device and the audio/video file is thus leaked, because the audio/video file is encrypted by using the key and the playback device is not the hard disk video recorder corresponding to the first identifier information, the private key of the hard disk video recorder corresponding to the first identifier information cannot be obtained and hence the key of the audio/video file bitstream cannot be decrypted and obtained, such that the audio/video file bitstream cannot be further decrypted and played. Only when the audio/video file bitstream is transmitted to the hard disk video recorder corresponding to the first identifier information, the hard disk video recorder can then further decrypt and obtain the corresponding key according to the corresponding private key and unlock the audio/video file bitstream, thereby significantly enhancing privacy security of the user.

In step S102, the at least one camera device receives the handshake signal sent from the hard disk video recorder.

In step S103, the at least one camera device generates a key according to the first identifier information of the hard disk video recorder in the handshake signal and second identifier information uniquely corresponding to a chip of the at least one camera device.

The camera device can generate the key by using the first identifier information of the hard disk video recorder and the second identifier information of the camera device through a predetermined algorithm, and encrypt the audio/video file bitstream recorded by the camera device by using the key through the encryption function thereof.

In step S104, the at least one camera device encrypts the audio/video file recorded thereof according to the key to generate an encrypted audio/video file bitstream, such that the encrypted audio/video file bitstream can be decrypted and watched uniquely only in the hard disk video recorder having the unique first identifier information.

In step S105, the hard disk video recorder receives and decrypts the encrypted audio/video file bitstream.

Specifically, the camera device encrypts the audio/video file recorded by the camera device by using the key generated in the above method so as to undoubtedly determine that the encrypted audio/video file bitstream is recorded by the camera device corresponding to the second identifier information, and allows the hard disk video recorder having the first identifier information to play the audio/video file recorded by the camera device.

It should be noted that, in this embodiment, certain means can be adopted while encrypting the audio/video file recorded by the camera device, such that only the hard disk video recorder corresponding to the first identifier information can obtain the above encryption key and further decrypt the encrypted audio/video file bitstream, and the encrypted audio/video file bitstream can be decrypted and watched uniquely only in the unique hard drive video recorder.

In an application scenario, the hard disk video recorder has an encryption function, and a predetermined algorithm can be adopted to obtain a private key and a public key corresponding to the hard disk video recorder. Meanwhile, the camera device also supports the encryption function, and can similarly adopt a predetermined algorithm to generate a private key and a public key corresponding to the camera device. At this point, the hard disk video recorder can further add the public key of the hard disk video recorder in the handshake signal sent to the camera device.

After the camera device generates the key and encrypts the audio/video file bitstream, double encryption can be performed on the key by using the private key of the camera device and the public key of the hard disk video recorder in the handshake signal, so as to achieve the device that encrypts the audio/video file bitstream by using the key of double encryption, wherein the device can decrypt the key only when both of the public key of the camera device and the private key of the hard disk video recorder are present.

In this application scenario, after double encryption is performed on the key, the encrypted key and the public key of the corresponding camera device are together inserted into the audio/video file packet recorded by the camera device. After receiving the encrypted audio/video file bitstream, the hard disk video recorder can decrypt the key according to the public key of the camera device and the private key of the hard disk video recorder, so as to decrypt the audio/video file bitstream.

Meanwhile, the audio/video file packet recorded by the camera device includes the public key of the camera device, and only the hard disk video recorder corresponding to the first identifier information has the private key corresponding to the public key of the hard disk video recorder used for encryption. Therefore, the key of the double encryption can be decrypted through only the hard disk video recorder, so as to further restore the corresponding audio/video file bitstream, and to play the audio/video file data through the hard disk video recorder.

It should be noted that, even if the audio/video file outputted from the camera device is duplicated to another playback device, or a network camera stores a recorded audio/video file in a third-party network or a cloud storage device and the audio/video file is thus leaked, because the audio/video file is encrypted by using the key and the playback device is not the hard disk video recorder corresponding to the first identifier information, the private key of the hard disk video recorder corresponding to the first identifier information cannot be obtained and hence the key of the audio/video file bitstream cannot be decrypted and obtained, such that the audio/video file bitstream cannot be further decrypted and played. Only when the audio/video file bitstream is transmitted to the hard disk video recorder corresponding to the first identifier, the hard disk video recorder can then further decrypt and obtain the corresponding key according to the corresponding private key and unlock the audio/video file bitstream, thereby significantly enhancing privacy security of the user.

For example, assume that an Internet Protocol camera (IPC) outputs an image file to a network video recorder (NVR) having an encryption function, wherein the image file includes a unique identifier (ID1) of the chip of the IPC. The NVR recognizes according to the received bitstream that the IPC corresponding to the ID1 supports an encryption function, and immediately displays a pop-out window to prompt the user: "The front-end camera device supports advanced security encryption. Is the security encryption to be activated?" If the user determines to activate the security encryption, the NVR sends a handshake signal to an ONVIF broadcast receiving port (UDP port 3702) at the IP address of the source of the bitstream received through the Ethernet, wherein the handshake signal includes a unique identifier (ID2) of the NVR chip and an RSA public key of the NVR.

After the IPC receives the information, the ID1 and the ID2 are processed by an encryption algorithm to generate an AES key. Thus, the image file bitstream recorded by the IPC is automatically encrypted through the key while the image file packet remains unaffected.

After the image file bitstream is encrypted, the AES key uses the RSA private key of the IPC and the RSA public key of the NVR to perform double encryption, and the double-encrypted key and the RSA public key of the IPC are together inserted in the image file packet and transmitted to the NVR. when the NVR receives the new image file bitstream, the NVR can use the RSA private key thereof and the RSA public key of the IPC to decrypt the above AES key, and then use the AES key to restore the image file bitstream.

In this example, even if the image file bitstream recorded by the IPC is duplicated to another device, or is stored in a third-party network or a cloud storage device and the audio/video file is thus leaked, the AES key cannot be decrypted and obtained due to the lack of the RSA private key of the NVR in this another device, and the corresponding image file bitstream cannot be restored, thereby enhancing the privacy security of the user.

In this embodiment, the audio/video file recorded by the camera device is encrypted by using the key generated according to the second identifier information of the camera device and the first identifier information of the hard disk video recorder, such that the encrypted audio/video file bitstream can be decrypted and watched uniquely only in the corresponding hard disk video recorder having the first identifier information. Thus, even if the audio/video file recorded by the camera device is leaked, the audio/video file cannot be played without the hard disk video recorder having the first identifier information, thereby enhancing the privacy and security of the audio/video file.

In one embodiment, the camera device is a camera device that supports an encryption function and has selected the encryption function.

Figure 3:
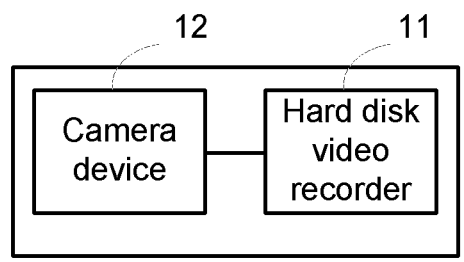
FIG. 3 is a block diagram of a system encrypting and decrypting an audio/video file according to an embodiment of the present invention.

FIG. 3 shows a block diagram of a system encrypting an audio/video file according to an embodiment of the present invention. The system includes a hard drive video recorder 11 and at least one camera device 12 connected to the hard disk video recorder 11. Details of the hard disk video recorder 11, the camera device 12 and the encryption are the same as those given in the description of the foregoing embodiments and can be referred from the embodiments of the method encrypting the audio/video file recorded by the camera device 12 of the present invention, and are thus omitted herein.

It should be noted that, in this embodiment, the audio/video file recorded by the camera device 12 is encrypted by using the key generated according to the second identifier information of the camera device 12 and the first identifier information of the hard disk video recorder 11, and double encryption is performed on the key by using a private key of the camera device 12 and a public key of the hard disk video recorder 11, such that the encrypted audio/video file bitstream can be decrypted and watched uniquely only in the corresponding hard disk video recorder 11 having the first identifier information, thereby enhancing the privacy security of the user.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded with the broadest interpretation so as to encompass all such modifications and similar arrangements and procedures.

What is claimed is:

1. A method, encrypting an audio/video file, applied to a system comprising at least one camera device and a hard disk video recorder, the method comprising:
receiving a handshake signal, which comprises first identifier information uniquely corresponding to a first chip of the hard disk video recorder;
generating a key according to the first identifier information of the hard disk video recorder in the handshake signal and second identifier uniquely corresponding to a second chip of the at least one camera device; and
encrypting an audio/video file recorded by the at least one camera device according to the key to generate an encrypted audio/video file bitstream, such that the encrypted audio/video file bitstream can be decrypted and watched uniquely only in the hard disk video recorder having the first identifier information.

2. The method according to claim 1, wherein the at least one camera device is a camera device that supports an encryption function and has selected the encryption function.

3. The method according to claim 2, before the step of receiving the handshake signal, the method further comprising:
the at least one camera device outputting an audio/video file bitstream to the hard disk video recorder, wherein the audio/video file bitstream outputted from the at least one camera device is embedded with the second identifier information uniquely corresponding to the second chip of the at least one camera device.

4. The method according to claim 1, wherein the handshake signal comprises the first identifier information of the first chip of the hard disk video recorder and a first public key of the hard disk video recorder.

5. The method according to claim 4, wherein the key generated by the at least one camera device is double encrypted through a private key of the at least one camera device and the first public key of the hard disk video recorder, and the double encrypted key and a second public key of the at least one camera device are together inserted in an audio/video file packet recorded by the at least one camera device.

6. The method according to claim 1, wherein the at least camera device is an Internet Protocol camera (IPC), and the hard disk video recorder is a network video recorder (NVR).

7. A method, decrypting an audio/video file, applied to a system comprising at least one camera device and a hard disk video recorder, the method comprising:
sending a handshake signal to the at least one camera device, wherein the at least one camera device supports an encryption function and has selected the encryption function, and the handshake signal comprises first identifier information uniquely corresponding to a first chip of the hard disk video recorder; and
receiving and decrypting an encrypted audio/video file bitstream, wherein the encrypted audio/video file bitstream is generated according to a key generated by the at least one camera device, the key is generated according to the first identifier information of the hard disk video recorder in the handshake signal and second identifier uniquely corresponding to a second chip of the at least one camera device, and the encrypted audio/video file bitstream can be decrypted and watched uniquely only in the hard disk video recorder having the first identifier information.

8. The method according to claim 7, before the step of sending the handshake signal to the at least one camera device, the method further comprising:
determining according to the second identifier information whether the at least one camera device supports the encryption function; and
when it is determined that the at least one camera device supports the encryption function, prompting a user whether to activate the encryption function, such that, after the user determines to activate the encryption function, the at least one camera device becomes a camera device that supports the encryption function and has selected the encryption function.

9. The method according to claim 7, wherein the handshake signal comprises the first identifier information of the first chip of the hard disk video recorder and a first public key of the hard disk video recorder.

10. The method according to claim 9, wherein the key generated by the at least one camera device is double encrypted by using a private key of the at least one camera device and the first public key of the hard disk video recorder, and the double encrypted key and a second public key of the at least one camera device are together inserted in an audio/video file packet recorded by the at least one camera device.

11. The method according to claim 9, wherein after the hard disk video recorder receives the encrypted audio/video file bitstream, the hard disk video recorder decrypts the key according to a second public key of the at least one camera device and a private key of the hard disk video recorder to accordingly decrypt the audio/video file bitstream.

12. The method according to claim 7, wherein at least camera device is an Internet Protocol camera (IPC), and the hard disk video recorder is a network video recorder (NVR).

13. A method, encrypting and decrypting an audio/video file, applied to a system comprising at least one camera device and a hard disk video recorder, comprising:
sending a handshake signal to the at least one camera device, wherein the at least one camera device supports an encryption function and has selected the encryption function, and the handshake signal comprises first identifier information uniquely corresponding to a first chip of the hard disk video recorder;
receiving the handshake signal;
generating a key according to the first identifier information of the hard disk video recorder in the handshake signal and second identifier uniquely corresponding to a second chip of the at least one camera device;
encrypting an audio/video file recorded by the at least one camera device according to the key to generate an encrypted audio/video file bitstream, such that the encrypted audio/video file bitstream can be decrypted and watched uniquely only in the hard disk video recorder having the first identifier information; and
receiving and decrypting the encrypted audio/video file bitstream.

14. A camera device, encrypting an audio/video file, the camera device performing steps of:
receiving a handshake signal, which comprises first identifier information uniquely corresponding to a first chip of the hard disk video recorder;
generating a key according to the first identifier information of the hard disk video recorder in the handshake signal and second identifier uniquely corresponding to a second chip of the at least one camera device; and encrypting an audio/video file recorded by the at least one camera device according to the key to generate an encrypted audio/video file bitstream, such that the encrypted audio/video file bitstream can be decrypted and watched uniquely only in the hard disk video recorder having the first identifier information.

15. A hard disk video recorder, decrypting an audio/video file, the hard disk video recorder performing steps of:
sending a handshake signal to the at least one camera device, wherein the at least one camera device supports an encryption function and has selected the encryption function, and the handshake signal comprises first identifier information uniquely corresponding to a first chip of the hard disk video recorder; and
receiving and decrypting an encrypted audio/video file bitstream, wherein the encrypted audio/video file bitstream is generated according to a key generated by the at least one camera device, the key is generated according to the first identifier information of the hard disk video recorder in the handshake signal and second identifier uniquely corresponding to a second chip of the at least one camera device, and the encrypted audio/video file bitstream can be decrypted and watched uniquely only in the hard disk video recorder having the first identifier information.

16. A system, encrypting and decrypting an audio/video file, the system comprising a hard disk video recorder and at least one camera device connected to the hard disk video recorder, the system performing steps of:
the hard disk video recorder sending a handshake signal to the at least one camera device, wherein the at least one camera device supports an encryption function and has selected the encryption function, and the handshake signal comprises first identifier information uniquely corresponding to a first chip of the hard disk video recorder;
the at least one camera device receiving the handshake signal;
the at least one camera device generating a key according to the first identifier information of the hard disk video recorder in the handshake signal and second identifier uniquely corresponding to a second chip of the at least one camera device;
the at least one camera device encrypting an audio/video file recorded by the at least one camera device according to the key to generate an encrypted audio/video file bitstream, such that the encrypted audio/video file bitstream can be decrypted and watched uniquely only in the hard disk video recorder having the first identifier information; and
the hard disk video recorder receiving and decrypting the encrypted audio/video file bitstream.

17. The system according to claim 16, before the step of the hard disk video recorder sending the handshake signal to the at least one camera device, the system further performs steps of:
the at least one camera device outputting an audio/video file bitstream, wherein the audio/video file bitstream outputted from the at least one camera device is embedded with the second identifier information uniquely corresponding to the second chip of the at least one camera device;
the hard drive video recorder receiving the audio/video file bitstream outputted from the at least one camera device;
determining according to the second identifier information whether the at least one camera device supports the encryption function; and
when it is determined that the at least one camera device supports the encryption function, prompting a user whether to activate the encryption function, such that, after the user determines to activate the encryption function, the at least one camera device becomes a camera device that supports the encryption function and has selected the encryption function.

18. The system according to claim 16, wherein the handshake signal comprises the first identifier information of the first chip of the hard disk video recorder and a first public key of the hard disk video recorder.

19. The system according to claim 18, wherein the key generated by the at least one camera device is double encrypted by using a private key of the at least one camera device and the first public key of the hard disk video recorder, and the double encrypted key and a second public key of the at least one camera device are together inserted in an audio/video file packet recorded by the at least one camera device.

20. The system according to claim 19, wherein after the hard disk video recorder receives the encrypted audio/video file bitstream, the hard disk video recorder decrypts the key according to a second public key of the at least one camera device and a private key of the hard disk video recorder to accordingly decrypt the audio/video file bitstream.

* * * * *